United States Patent [19]
Aidlin et al.

[11] Patent Number: 5,584,614
[45] Date of Patent: Dec. 17, 1996

[54] AIR HANDLING SYSTEM FOR A PNEUMATIC CONVEYOR

[76] Inventors: Stephen H. Aidlin, 1521 Eastbrook Dr., Sarasota, Fla. 34231; Samuel S. Aidlin, 5079 Village Garden, Sarasota, Fla. 34234; Larry Kincaid, 2635 Hyde Park St., Sarasota, Fla. 34239

[21] Appl. No.: 608,460

[22] Filed: Feb. 28, 1996

[51] Int. Cl.⁶ .................................................... B65G 51/02
[52] U.S. Cl. ............................................. 406/88; 415/166
[58] Field of Search ........................ 406/88, 86; 415/151, 415/155, 166

[56] References Cited

U.S. PATENT DOCUMENTS

| | | | |
|---|---|---|---|
| 716,765 | 12/1902 | Sargent | 415/151 |
| 2,098,144 | 11/1937 | Hanus | 415/151 |
| 2,441,845 | 5/1948 | Robinson | 415/166 |
| 2,729,202 | 1/1956 | Sanders | 415/151 |
| 4,938,636 | 7/1990 | Aidlin et al. | 406/86 |
| 5,421,678 | 6/1995 | Aidlin et al. | 406/88 |

*Primary Examiner*—Gary C. Hoge

[57] ABSTRACT

An air handling system comprising a track having a lower extent for supporting an object to be conveyed by the flow of pressurized air and an upper extent having a plenum chamber for receiving pressurized air and for directing it in contact with the object to be conveyed for effecting movement of the object. The track also has air-directing louvers between the upper and lower extents and an aperture in the upper extent. An impeller is mounted adjacent to the aperture of the upper extent of the track. A tapering input duct with an inlet end and a circular outlet end are mounted adjacent to the impeller with a circular screen in the outlet of the duct adjacent to the impeller. The screen has a centrally disposed hole. A baffle is mounted adjacent to the screen. The baffle includes a plurality of pie-shaped segments each with an arcuate outer edge overlying the periphery of the screen and with V-shaped interior edges with a hole. The segments are similarly configured. The baffle also includes a threaded rod extending through the holes of the segment and screen with an associated locking nut to hold the segment in a preselected orientation with respect to the screen between a fully opened upper orientation when the segments overlie each other and a fully closed orientation of about 0 degrees where the edges of all the segments overlie each other.

2 Claims, 3 Drawing Sheets

FIG 2
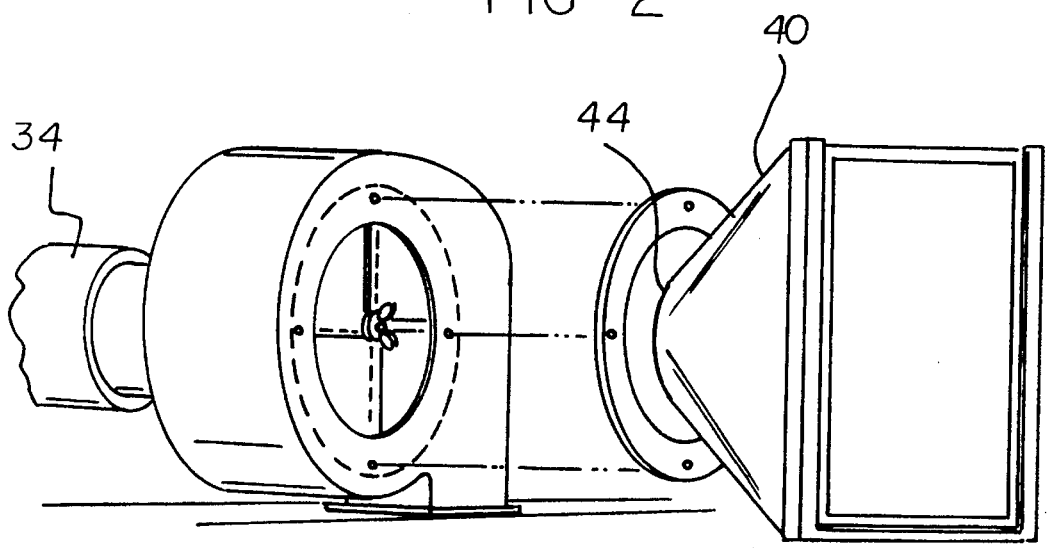
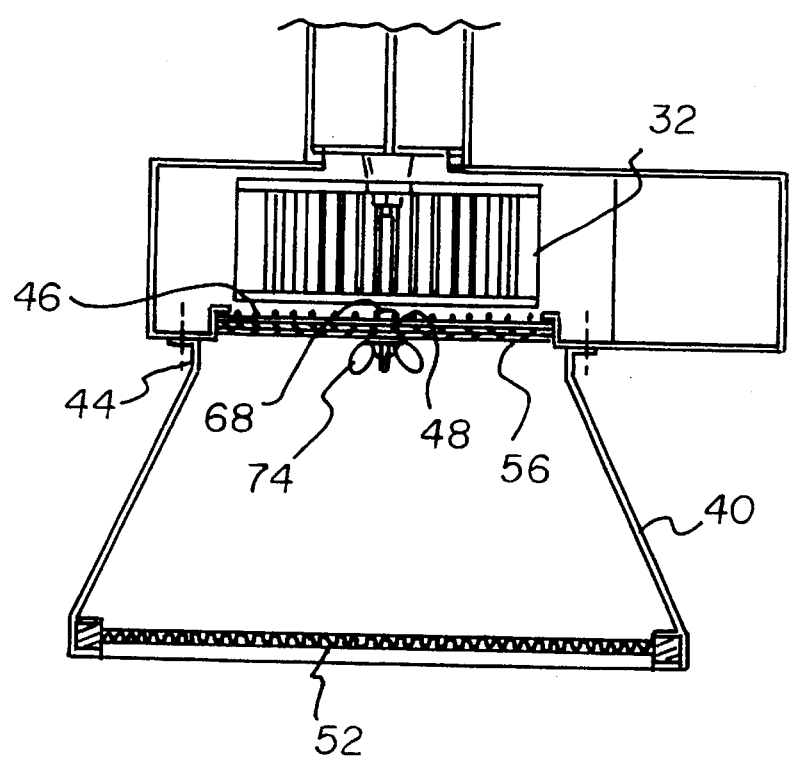
FIG 3

AIR HANDLING SYSTEM FOR A PNEUMATIC CONVEYOR

BACKGROUND OF THE INVENTION

1. Field of the Invention

The present invention relates to an air handling system for a pneumatic conveyor and, more particularly, pertains to varying the feed rate of bottles fed by a pneumatic conveyor while maximizing the usage of an associated air filter.

2. Description of the Prior Art

The use of conveyors including pneumatic conveyors of various designs and configurations are known in the prior art. More specifically, conveyors including pneumatic conveyors of various designs and configurations heretofore devised and utilized for the purpose of feeding objects while increasing the efficiency of the conveying mechanisms through various methods and apparatuses are known to consist basically of familiar, expected and obvious structural configurations, notwithstanding the myriad of designs encompassed by the crowded prior art which have been developed for the fulfillment of countless objectives and requirements.

In this respect, the air handling system for a pneumatic conveyor according to the present invention substantially departs from the conventional concepts and designs of the prior art, and in so doing provides an apparatus primarily developed for the purpose of varying the feed rate of bottles fed by a pneumatic conveyor while maximizing the efficiency of its components.

Therefore, it can be appreciated that there exists a continuing need for new and improved air handling system for a pneumatic conveyor which can be used for varying the feed rate of bottles fed by a pneumatic conveyor while maximizing the efficiency of its components. In this regard, the present invention substantially fulfills this need.

SUMMARY OF THE INVENTION

The present invention provides an improved air handling system for a pneumatic conveyor.

To attain this, the present invention essentially comprises a new and improved air handling system for a pneumatic conveyor for varying the feed rate of bottles fed by the pneumatic conveyor while maximizing the usage of its associated air filter, comprising, in combination, a track. The track has a lower extent for supporting a bottle to be conveyed by the flow of pressurized air and an upper extent having a plenum chamber for receiving pressurized air and for directing it in contact with the bottle to be conveyed for effecting movement of the bottle. The track also has air-directing louvers between the upper and lower extents and an aperture in the upper extent for receiving the pressurized air from a pressurized air source. A squire cage impeller is mounted adjacent to the aperture of the upper extent of the track with a motor for coupling to a source of electrical potential. A tapering input duct with a large rectangular inlet end for receiving ambient air and a small circular outlet end are mounted adjacent to the impeller with a circular screen in the outlet of the duct adjacent to the motor. The screen has a centrally disposed hole. An air filter is removably mounted adjacent to the inlet end of the duct to filter air entering the duct and impeller and plenum chamber. A baffle is mounted adjacent to the screen. The baffle includes four pie-shaped segments each with an arcuate outer edge overlying the periphery of the screen and with V-shaped interior edges with a hole to overlie the hole of the screen. The segments are similarly configured and each constitutes slightly greater than 90 degrees. The baffle also includes a threaded rod extending through the holes of the segment and screen with an associated locking nut to hold the segment in a preselected orientation with respect to the screen between a fully opened upper orientation of about 270 degrees when the segments overlie each other and a fully closed orientation of about 0 degrees where the edges of all the segments overlie each other.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

An object of the present invention is to vary the feed rate of bottles fed by a pneumatic conveyor while efficiently filtering the feeding air.

Another object of the present invention to provide a new and improved air handling system comprising a track having a lower extent for supporting an object to be conveyed by the flow of pressurized air and an upper extent having a plenum chamber for receiving pressurized air and for directing it in contact with the object to be conveyed for effecting movement of the object. The track also has air-directing louvers between the upper and lower extents and an aperture in the upper extent. An impeller is mounted adjacent to the aperture of the upper extent of the track with a impeller. A tapering input duct with an inlet end and a circular outlet end are mounted adjacent to the impeller with a circular screen in the outlet of the duct adjacent to the impeller. The screen has a centrally disposed hole. A baffle is mounted adjacent to the screen. The baffle includes a plurality of pie-shaped segments each with an arcuate outer edge overlying the periphery of the screen and with V-shaped interior edges with a hole. The segments are similarly configured. The baffle also includes a threaded rod extending through the holes of the segment and screen with an associated locking nut to hold the segment in a preselected orientation with respect to the screen between a fully opened upper orientation when the segments overlie each other and a fully closed orientation of about 0 degrees where the edges of all the segments overlie each other.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an enlarged exploded view of the air handling components shown in FIG. 1.

FIG. 3 is a cross sectional view taken vertically through the center of the air handling components of FIGS. 1 and 2.

Similar reference characters refer to similar parts throughout the several views of the drawings.

DESCRIPTION OF THE PREFERRED EMBODIMENT

Figure 1:
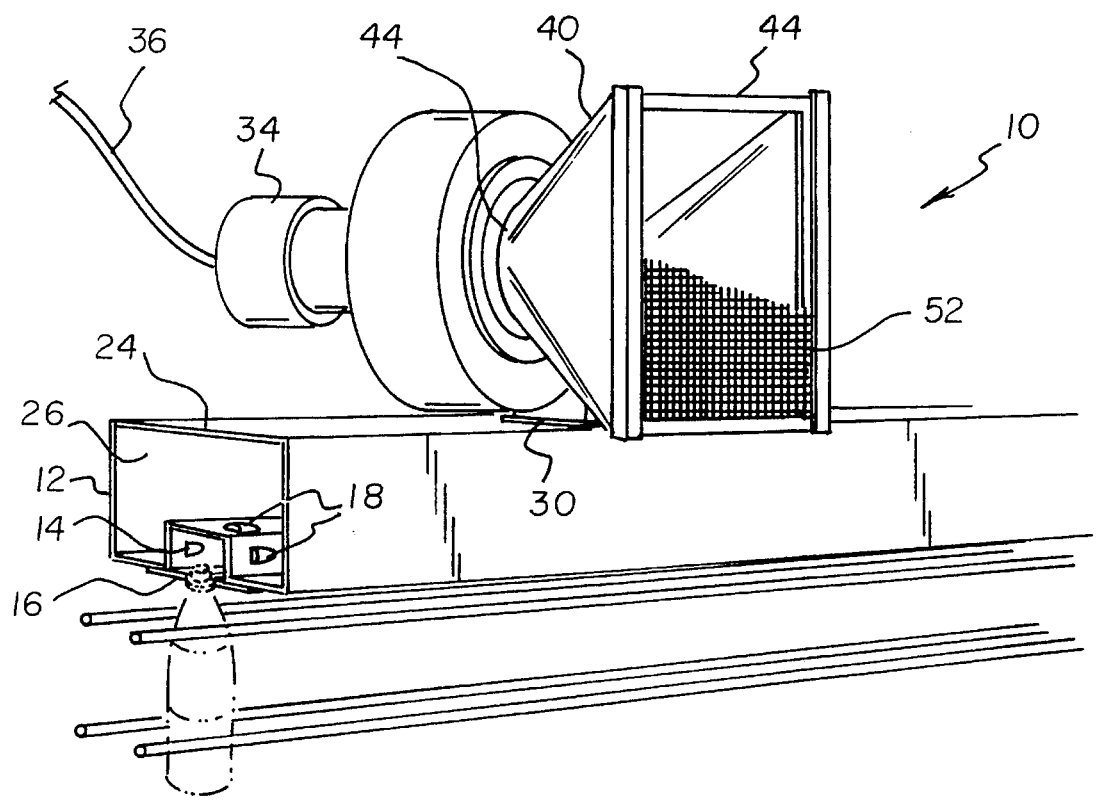
FIG. 1 is a perspective illustration of the preferred embodiment of the air handling system for a pneumatic conveyor constructed in accordance with the principles of the present invention.
Figure 4:
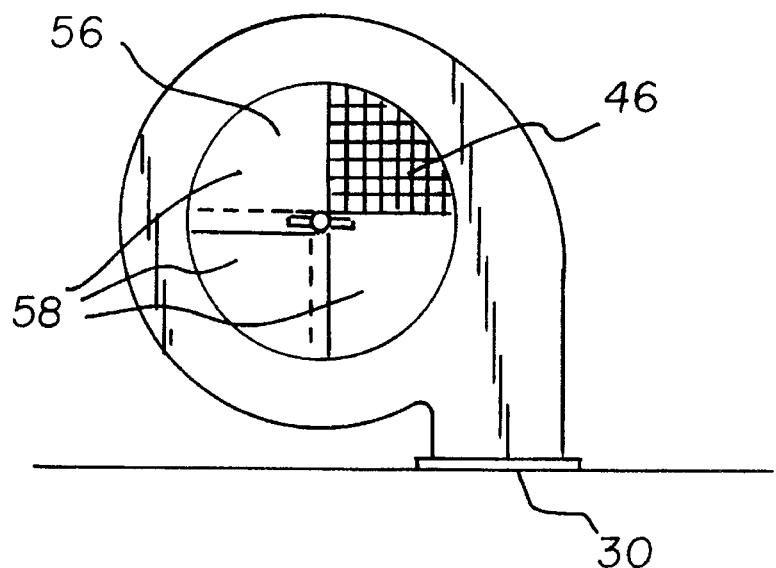
FIGS. 4 through 6 are front elevational views of the panels of FIGS. 2 and 3 illustrating various configurations of adjustment.
Figure 5:
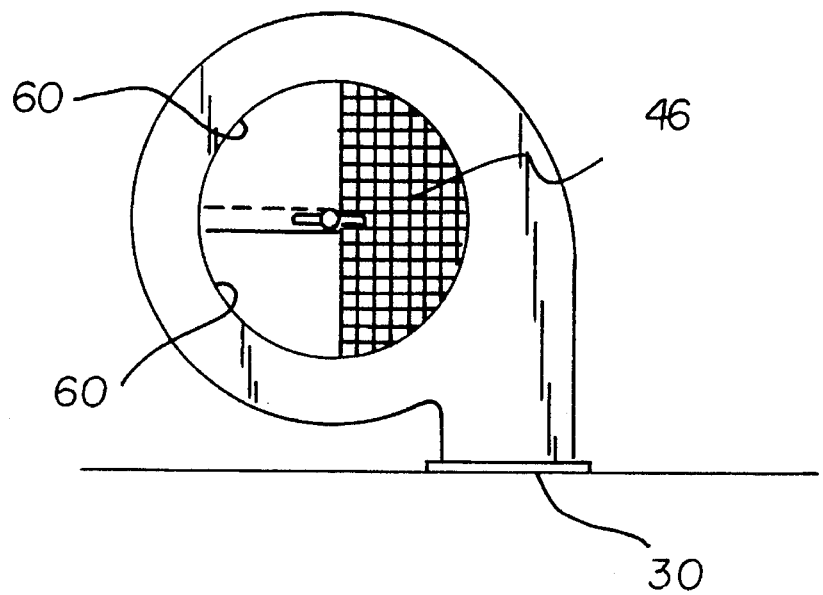
Figure 6:
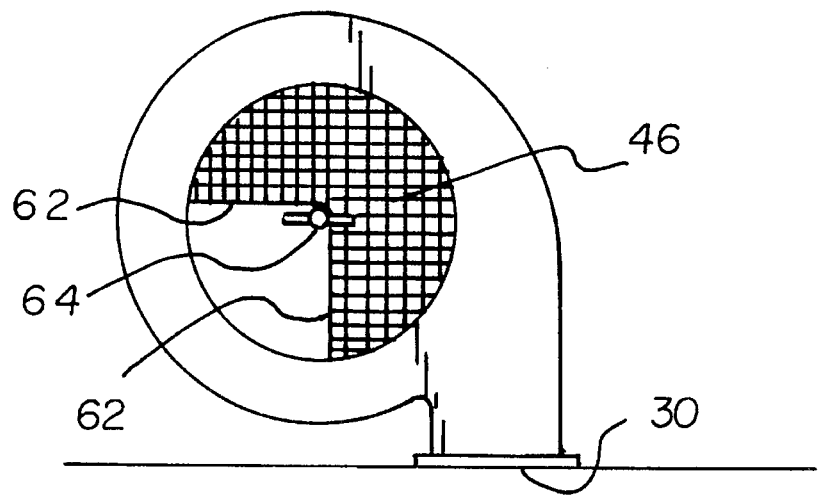

With reference now to the drawings, and in particular to FIG. 1 thereof, a new and improved air handling system for a pneumatic conveyor embodying the principles and concepts of the present invention and generally designated by the reference numeral 10 will be described.

The present invention, the new and improved air handling system for a pneumatic conveyor, is comprised of a plurality of components. Such components in their broadest context include a track, an impeller, an input duct, an air filter and a baffle. Such components are individually configured and correlated with respect to each other so as to attain the desired objective.

More specifically, the central component of the system 10 of the present invention is a track 12. The track has a lower extent 14. The lower extent is formed with inturned edges 16 for supporting a bottle or other object with an enlargement on the upper extent. Such bottle or object constitutes the object to be conveyed. Conveyance is effected by a flow of pressurized air moved through air directing louvers 18 between the upper and lower extents of the track.

The track is also formed with an upper extent 24. The upper extent forms an interior plenum chamber 26. The plenum chamber is for receiving pressurized air and for directing such received pressurized air through the louvers into contact with the bottle or object being conveyed. The air directing louvers, due to their configuration, effect the movement of the bottle or object along the track in a proper direction.

The track is also formed with an aperture 30 in the upper extent. A plurality of such apertures are preferably provided when an elongated track or series of tracks are utilized. The aperture is sized, shaped and positioned for receiving pressurized air from a pressurized air source as will be described.

The next component of the system 10 is a squirrel cage impeller 32 with an associated motor 34. Such motor is mounted adjacent to the aperture above the upper extent of the track. It has an electrical line 36 for coupling the motor to a source of electrical potential in the conventional manner.

Mounted on the squirrel cage impeller on the side opposite from the electrical line is a tapering input duct 40. Such duct is configured with a large rectangular inlet end 42. The function of the inlet end is for receiving ambient air. The input duct also has a small circular outlet end 44. Such outlet end is mounted adjacent to the blower housing on the side thereof remote from the electrical line. In association with the outlet end is a circular screen 46 in the outlet of the duct adjacent to the motor. The screen has a centrally disposed hole 48.

Next provided is an air filter 52. The air filter is for filtering the air entering the impeller for increasing the cleanliness and enhance the efficiency of the system. The air filter is removably mounted adjacent to the inlet of the duct. It functions to filter all air entering the duct and the impeller and the plenum chamber.

Lastly provided is a baffle 56. The baffle is mounted on the screen. The baffle includes a plurality, preferably four, pie-shaped segments 58. Each of the segments has an outer edge 60 in the form of a part of a circle. They extend for slightly greater than one-fourth of a circle or 90 degrees. Such outer edges overlie the periphery of the screen. The segments have V-shaped interior edges 62. Each segment is formed with a hole 64 adjacent to the apex of the V-shaped edges. The holes of the segments are all adapted to overlie the hole of the screen. The segments are each similarly configured. Each is of a similar size to constitute slightly greater than 90 degrees of an arc.

The baffle also includes a threaded rod 68 extending through the holes of the segments and the screen. The threaded rod is welded or otherwise secured to the screen around the hole on the interior side of the screen remote from the inlet of the baffle.

In association with the threaded rod is an associated nut 74. The nut is preferably a locking nut for retaining the segments under vibration. The function of the nut is to hold the segments in a preselected orientation on the screen with respect to the screen. The locking nut may be loosened or tightened by an operator during the securement of movement of the segments with respect to each other and with respect to the screen. The segments are adapted to move between a fully opened orientation of about 270 degrees or slightly less due to each segment being slightly greater than 90 degrees. This occurs when all the segments overlie each other. The other extreme position of the segments is a fully closed orientation. In such orientation, 0 degrees of the screen are exposed for the passage of air. In such situation, only the edges of each segment will overlie the edge of the next adjacent segment of the stack secured to the screen. It should be understood that the extent of opening may thus be moved from 0 degrees to 270 degrees for varying the amount of pressurized air fed to the plenum chamber for varying the speed of movement of the bottles for any particular application as a function of the desire of the operator.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved air handling system for a pneumatic conveyor for varying the feed rate of bottles fed by the pneumatic conveyor while maximizing the usage of its associated air filter, comprising, in combination:

a track having a lower extent for supporting a bottle to be conveyed by the flow of pressurized air and an upper extent having a plenum chamber for receiving pressurized air and for directing it in contact with the bottle to be conveyed for effecting movement of the bottle, the track also having air-directing louvers between the upper and lower extents and an aperture in the upper extent for receiving the pressurized air from a pressurized air source;

a squirel cage impeller mounted adjacent to the aperture of the upper extent of the track with a motor for coupling to a source of electrical potential;

a tapering input duct with a large rectangular inlet end for receiving ambient air and a small circular outlet end mounted adjacent to the impeller with a circular screen in the outlet of the duct adjacent to the motor, the screen having a centrally disposed hole;

an air filter removably mounted adjacent to the inlet end of the duct to filter air entering the duct and impeller and plenum chamber; and a baffle mounted adjacent to the screen, the baffle including four pie-shaped segments each with an arcuate outer edge overlying the periphery of the screen and with V-shaped interior edges with a hole to overlie the hole of the screen, the segments being similarly configured and each constituting slightly greater than 90 degrees, the baffle also including a threaded rod extending through the holes of the segments and screen with an associated locking nut to hold the segments in a preselected orientation with respect to the screen between a fully opened upper orientation of about 270 degrees when the segments overlie each other and a fully closed orientation of about 0 degrees where the edges of all the segments overlie each other.

2. An air handling system comprising:

a track having a lower extent for supporting an object to be conveyed by the flow of pressurized air and an upper extent having a plenum chamber for receiving pressurized air and for directing it in contact with the object to be conveyed for effecting movement of the object, the track also having air-directing louvers between the upper and lower extents and an aperture in the upper extent for receiving the pressurized air from a pressurized air source;

an impeller mounted adjacent to the aperture of the upper extent of the track with a motor for coupling to a source of electrical potential;

a tapering input duct with an inlet end for receiving ambient air and a circular outlet end mounted adjacent to the impeller with a circular screen in the outlet of the duct adjacent to the impeller, the screen having a centrally disposed hole;

a baffle mounted adjacent to the screen, the baffle including a plurality of pie-shaped segments each with an arcuate outer edge overlying the periphery of the screen and with V-shaped interior edges with a hole to overlie the hole of the screen, the segments being similarly configured and each constituting slightly greater than 90 degrees, the baffle also including a threaded rod extending through the holes of the segments and screen with an associated locking nut to hold the segments in a preselected orientation with respect to the screen between a fully opened upper orientation when the segments overlie each other and a fully closed orientation of about 0 degrees where the edges of all the segments overlie each other.

* * * * *